Figure 1:
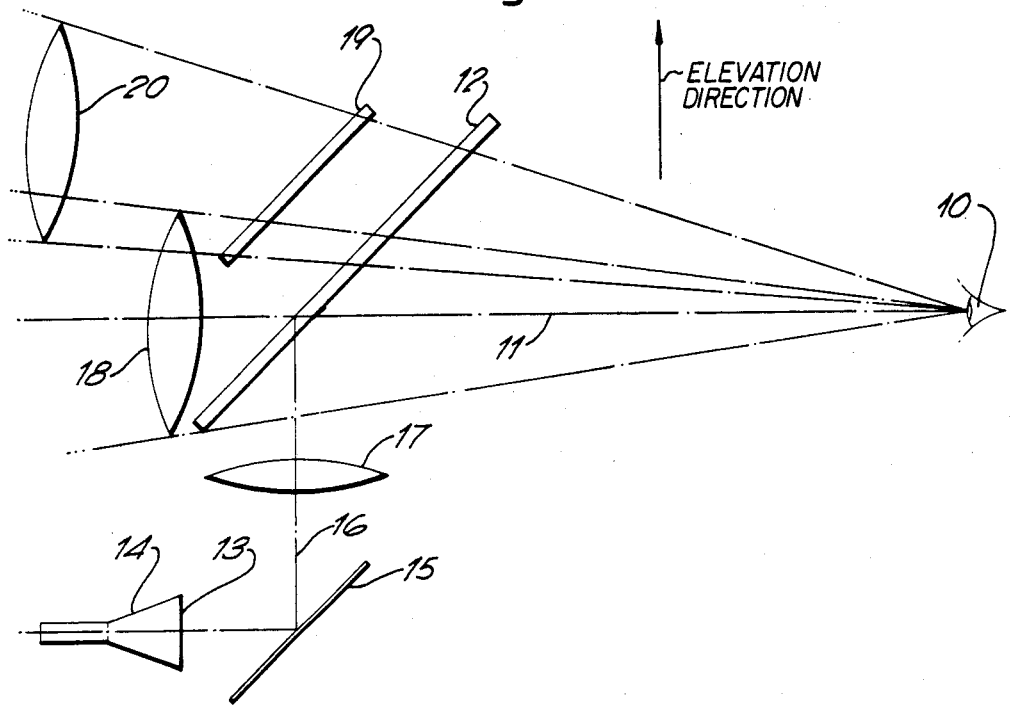

United States Patent [19]

Boot

[11] Patent Number: 4,647,142

[45] Date of Patent: Mar. 3, 1987

[54] METHOD OF EXTENDING THE FIELD OF VIEW IN A HEAD-UP DISPLAY

[75] Inventor: Alan Boot, Midlothian, Scotland

[73] Assignee: Ferranti plc, Cheshire, England

[21] Appl. No.: 559,443

[22] Filed: Dec. 8, 1983

[30] Foreign Application Priority Data

Dec. 17, 1982 [GB] United Kingdom ............... 8236053

[51] Int. Cl.$^4$ ..................... G02B 5/32; G02B 27/14
[52] U.S. Cl. ..................................... 350/3.7; 350/174
[58] Field of Search ..................... 350/3.7, 3.72, 174

[56] References Cited

U.S. PATENT DOCUMENTS 4,398,799  8/1983  Swift .................................. 350/174

FOREIGN PATENT DOCUMENTS 1448190  9/1976  United Kingdom .

OTHER PUBLICATIONS

Collier et al, *Optical Autography*, Section 1.6, pp. 16–18, Academic, Press, N.Y., 1971.
Swift, D. W., "Diffractive Optics for Avionic Displays", AGARD Conference on Advanced Avionics and the Military Aircraft Man–Machine Interface, *Proceedings*, No. 329, Feb., 1982, pp. 31-1 to 31-8.

*Primary Examiner*—Bruce Y. Arnold
*Attorney, Agent, or Firm*—Larson and Taylor

[57] ABSTRACT

A method is provided for extending the field of view of a head-up display includes a combiner (31) through which a scene may be viewed by an observer (10), and a display unit (14) having a display surface 13 from which light is directed by a collimating lens (17) on to the combiner. The method involves using combiner which comprises a thick phase holographic optical element extending between the limits of the total field of view in the elevation direction and having a fringe pattern formed therein. The pattern is in the form of parallel fringes 32 and the combiner is disposed so that the fringes extend perpendicular to the elevation direction and are aligned perpendicular to the plane bisecting the angle of intersection of the light-line (11) and the optical axis (16) of the collimating lens (17).

5 Claims, 4 Drawing Figures

METHOD OF EXTENDING THE FIELD OF VIEW IN A HEAD-UP DISPLAY

This invention relates to head-up displays, and in particular to method of providing an extended instantaneous field of view in such display.

Head-up displays are well known, and are used to enable an observer to view a scene ahead of him whilst at the same time viewing a separately-generated display. Usually, the observer is the pilot of an aircraft, and the display shows certain parameters relating to the flight of the aircraft. In practice, the display is combined with the scene by using a combiner in the form of a partially reflecting surface onto which the display is projected through a collimating lens. The instantaneous field of view is a function of both the collimating lens diameter and its distance from the observer's eye. However, there are practical limits to increasing the instantaneous field of view by increasing the collimating lens diameter or shortening the lens-to-eye distance, and in consequence other methods have been sought to achieve this increase. In particular, efforts have been directed towards providing an extension in the elevation direction. "Elevation" in this sense has to be defined with reference to the attitude of the aircraft or pilot, and not with reference to external axes. One technique for providing the extended field of view involves using a second combiner extending parallel to the first but displaced in the elevation direction relative to the first combiner. With this configuration, the partially reflecting coatings are graded to give subjectively uniform transmission and reflection characteristics when viewed from the normal eye position. This produces the desired extension of the instantaneous field of view but is not without potential drawbacks, there being three potential sources of shading across the field of view. The lower edge of the upper combiner or a reflection of this via the lower and upper combiners may cause sharp lines or shadows to appear across the field of view. In addition, if the observer's eye is above or below the normal viewing position, a band of either lower or higher transmission will occur where the combiner graded coating overlap is no longer optimised. Any one of these features may in extreme cases be confused with the horizon.

It is an object of the invention to provide a method for extending the instantaneous field of view in a head-up display without the problems referred to above.

According to the present invention, a method is provided for extending the instantaneous field of view in elevation in a head-up display. The display includes a combiner through which the scene may be viewed by an observer and a display unit having a display surface from which light of a predetermined wavelength is directed by a collimating lens onto the combiner for reflection towards the observer combined with the scene. The method of the invention comprises providing a combiner in the form of a thick phase holographic optical element and disposing the thick phase holographic optical element so that the element extends between the limits of the chosen instantaneous field of view in the elevation direction and is oriented so as to provide an extended instantaneous field of view in that direction perpendicular to the nominal sight line. The element has a holographic fringe pattern formed therein in the form of parallel fringe planes and the element is disposed such that each fringe plane extends perpendicular to the plane bisecting the angle of intersection between the nominal sight-line and the optical axis extending between the combiner and the collimating lens, and such that the individual fringe planes are inclined to the plane of the combiner.

Figure 2:
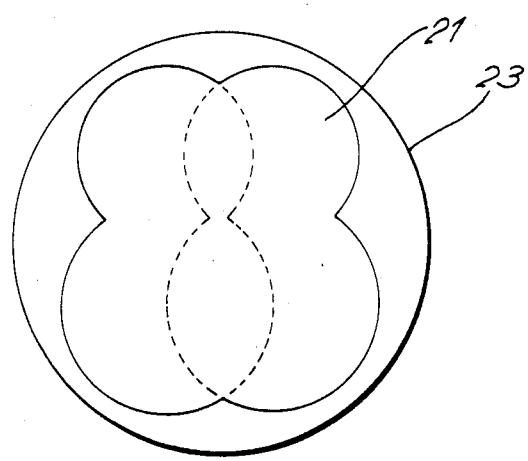
Figure 3:
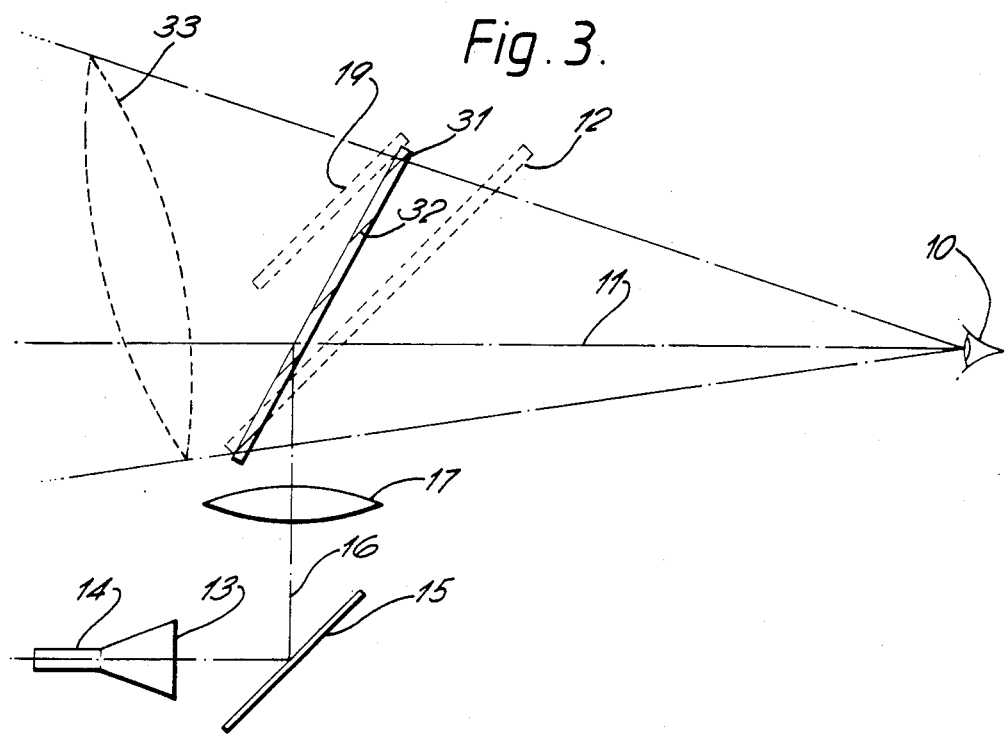
Figure 4:
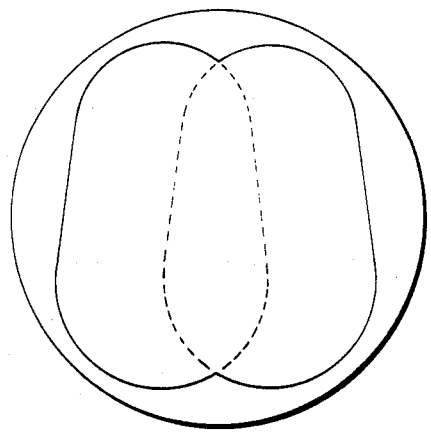

The invention will now be described with reference to the accompanying drawings, in which:

FIG. 1 is a schematic diagram of a conventional head-up display;

FIG. 2 indicates the fields of view of the display of FIG. 1;

FIG. 3 is a schematic diagram of a head-up display illustrating the method according to the invention; and FIG. 4 indicates the fields of view of the display of FIG. 3.

Referring now to FIG. 1, this shows a conventional head-up display having two combiners, and hence known as a "dual combiner" head-up display. The drawing shows the limits of the instantaneous field of view in elevation by means of chain-dotted lines.

The drawing shows the observer's eye 10 viewing generally along a nominal sight-line 11 through a first combiner 12. A display surface, such as the screen 13 of a cathode-ray tube 14, produces a display which is reflected by a mirror 15 along the optical axis 16 of a collimating lens 17. The optical axis 16 and sight-line 11 meet at the combiner 12, and the light from the display surface 13 is reflected back towards the observer 10 as collimated light, light from points other than the centre of the display surface 13 being perceived at varying angles with respect to the sight line. The display surface and external scene are visible in combination through a "porthole" 18, which is the image of the collimating lens in the combiner, and hence the observer's instantaneous field of view is defined by this "porthole".

A second combiner plate 19 is located above and behind the plate 12 and provides a second "porthole" 20 which overlaps but extends above the first one. FIG. 2 shows, for each eye of the observer, the four overlapping "portholes" 21 seen in any one head position. The observer can clearly move his head, and these four "portholes" will also apparently move in opposition with respect to the collimated image and the scene. The total field of view 23, is that range of angles over which the observer will with appropriate head and "porthole" alignment be able to see the whole of the display surface 13 superimposed on the external scene.

The combiner plates 12 and 19 are coated, and the coatings are graded where the fields of view overlap, but it is still possible, above or below the nominal head position, for the observer to see a dark or a light shadow across his field of view where the graded coatings no longer match, and also a line where the bottom of the upper plate ends, either directly, or as a double reflection in both combiners, or both. This can cause serious problems. In addition, the structure necessary to support the two combiner plates, and the plates themselves, are necessarily fairly bulky. The two combiner plates are shown as being inclined at 45° to the sight-line, but this angle depends upon the physical arrangement of the components, and may vary as the optical axis of the collimating lens is inclined to suit any particular arrangement.

FIG. 3 illustrates an embodiment of the method of the invention, which overcomes the problems referred to. The two combiner plates 12 and 19 of the arrangement shown in FIG. 1 are replaced by a single thick phase holographic optical element 31. This element is inclined at an angle to the nominal sight-line 11 such that the element extends over the entire field of view of the observer. The original plates 12 and 19 of the dual-plate combiner of FIG. 1 are shown in broken line, and it will be seen that the holographic element 31 extends from the position occupied by the lower limit of plate 12 to that occupied by the upper limit of plate 19.

A thick phase holographic element is an element which is many optical wavelengths thick and has fringes formed in it in the form of variations in refractive index. It also has the property that for reflection by constructive interference all the light reflected from any one fringe and also from successive fringes must be in phase. A result of this is that the element will reflect only one particular wavelength in a particular direction. The wavelength is chosen to be that of the light emitted by the display surface, that is the screen of the cathode-ray tube 14. Light passing through the element from the external scene will have this particular wavelength missing from its spectrum.

It is necessary, as shown in FIG. 3, that the fringes, shown schematically at 32, are parallel to one another and the longitudinal edges thereof (not shown in FIG. 3) extend perpendicular to the nominal elevation direction. In addition, the planes of the fringes 32, i.e., the lateral edges seen in FIG. 3, are inclined to the surface of the holographic element in such a way that they lie in planes parallel to the original separate combiner plates 12 and 19. This means the the fringes must be perpendicular to the plane bisecting the angle of intersection at the combiner between the sight-line 11 and the optical axis 16 of the collimating lens 17. As stated earlier, this angle will obviously vary as the physical arrangement of the components of the display is varied, and will usually be in the range 60° to 120°.

Referring again to FIG. 3, the effect of using the single holographic element will be to produce a single "porthole" 33, apparently inclined to the sight-line 11. Hence as shown in FIG. 4 the instantaneous field of view for each eye will be elongated in the elevation direction but also slightly tapered. It is also clear that the initial constraint with the dual combiner system which limited the instantaneous field of view extension, namely the necking effect between the two overlapping portholes in FIG. 2 no longer applies, and in consequence the distance between the two combiners used in constructing the equivalent single holographic combining element can be extended or compressed in order to obtain the desired vertical field of view extension.

Nothing has been said about the optimisation, construction, or manufacture of the holographic optical element used in the invention, since both of these aspects are well-known and described in the available literature.

It is obviously a simple matter to replace the existing combiner plate or plates in conventional head-up displays with a holographic optical element to provide the extended field of view in the elevation direction without any visible discontinuity problems.

Further, the optical efficiency of the holographic element is much higher than that of a conventional combiner plate. Up to 90% of the light from the cathode-ray tube screen is reflected towards the observer, compared with perhaps 25% for the conventional combiner. In addition, the holographic element transmits up to 80% of light of other wavelengths, somewhat more than with the conventional combiner.

What we claim is:

1. A method for providing an extending instantanous field of view in elevation to a head-up display, said display including a combiner through which a scene may be viewed by an observer, and a display unit having a display surface from which light of a predetermined wavelength is directed by a collimating lens onto the combiner for reflection towards the observer combined with said scene, said method comprising providing a combiner in the form of a thick phase holographic optical element and disposing the thick phase holographic optical element so that the element extends between the limits of the chosen instantaneous field of view in the elevation direction and is oriented so as to provide an extended instantaneous field of view in said direction perpendicular to the nominal sight-line, said element having a holographic fringe pattern formed therein in the form of parallel fringe planes, and said element being disposed such that each fringe plane extends perpendicular to the plane bisecting the angle of intersection between the said nominal sight-line and the optical axis extending between the combiner and the collimating lens, and such that the individual fringe planes are inclined to the plane of the combiner.

2. A method as claimed in claim 1 in which the screen of a cathode-ray tube is used to provide the display surface.

3. A method as claimed in claim 1 in which the spacing of the fringe planes in the combiner is such as to reflect only light of said predetermined wavelength, light of other wavelengths being transmitted through the combiner.

4. A method as claimed in claim 1 in which the angle of intersection provided between the sight-line and the optical axis of the collimating lens is in the range 60° to 120°.

5. A method as claimed in claim 1 in which the fringe planes include lateral and longitudinal edges, said element having the lateral edges of the individual fringe planes inclined to the plane of the combiner and said element being disposed so that the longitudinal edges of the fringe planes as viewed in the direction of the nominal sight-line are perpendicular to the elevation direction.

* * * * *